US010281966B2

(12) United States Patent
Lu

(10) Patent No.: US 10,281,966 B2
(45) Date of Patent: May 7, 2019

(54) POWER COUPLING DEVICE WITH DETECTION AND POWER ADJUSTMENT FUNCTION

(71) Applicant: RYANTEK CO., LTD, New Taipei (TW)

(72) Inventor: Liang-Chun Lu, New Taipei (TW)

(73) Assignee: RYANTEK CO., LTD, New Taipei (TW)

( * ) Notice: Subject to any disclaimer, the term of this patent is extended or adjusted under 35 U.S.C. 154(b) by 0 days.

(21) Appl. No.: 15/700,197

(22) Filed: Sep. 11, 2017

(65) Prior Publication Data
US 2019/0079569 A1 Mar. 14, 2019

(51) Int. Cl.
| G06F 1/00 | (2006.01) |
| G06F 11/30 | (2006.01) |
| G06F 1/26 | (2006.01) |
| H02J 9/06 | (2006.01) |
| G06F 1/28 | (2006.01) |
| G06F 1/30 | (2006.01) |

(52) U.S. Cl.
CPC ............... *G06F 1/263* (2013.01); *G06F 1/28* (2013.01); *G06F 1/30* (2013.01); *H02J 9/061* (2013.01)

(58) Field of Classification Search
None
See application file for complete search history.

(56) References Cited

U.S. PATENT DOCUMENTS

| 6,127,741 A * | 10/2000 | Matsuda ............... H02J 1/08 307/10.6 |
| 2004/0155697 A1* | 8/2004 | Aihara ................ G04C 10/00 327/530 |
| 2011/0080205 A1* | 4/2011 | Lee .................. H03K 17/0822 327/390 |
| 2014/0164803 A1* | 6/2014 | Huynh ................ G06F 1/3206 713/323 |

* cited by examiner

*Primary Examiner* — Nitin C Patel
(74) *Attorney, Agent, or Firm* — Jackson IPG PLLC; Demian K. Jackson

(57) ABSTRACT

A power coupling device with detection and power adjustment function includes at least one detection unit, at least one switch unit, at least one coupling unit, at least one amplification unit, at least one comparison unit and at least one logic unit. The detection unit serves to receive a first operation power and a second operation power. The coupling unit serves to couple the first and second operation powers for a power output end to output a regulated output power. The comparison unit serves to compare to generate a first comparison result and a second comparison result. According to the first and second comparison results, the logic unit logically judges to generate a triggering signal for controlling the switch unit to turn on or turn off the switch unit so as to adjust the power of the regulated output power.

16 Claims, 5 Drawing Sheets

POWER COUPLING DEVICE WITH DETECTION AND POWER ADJUSTMENT FUNCTION

BACKGROUND OF THE INVENTION

1. Field of the Invention

The present invention relates generally to a power coupling device, and more particularly to a power coupling device with detection and power adjustment function.

2. Description of the Related Art

A PC power supply unit is generally abbreviated as PSU. Along with the advance of computer industries, the PC power supply unit has become one of the inevitable products. The PC power supply unit is a sort of electrical energy conversion power supply (different from the battery). The PC power supply unit serves to convert the standard AC into regulated DC power for the internal components of a computer, such as the motherboard, the central processing unit (CPU), the compact disk drive, the hard disk, the fan and independent graphics card. Most of the current PC power supply units are switch-type power supply units. The input voltage will be automatically adapted to the civil power parameter of the residence of a user. With respect to some low-level products, it may be necessary for the user to adjust the voltage switch himself/herself. The input voltage of the currently often used ATX specification PC power supply unit generally ranges from 100 Vac to 250 Vac. The frequency is 50 Hz or 60 Hz and three regulated DC voltages of 12V, 5V and 3.3V are output.

However, with respect to some high-level products, the electrical power consumed by the personal computer (PC) has become greater and greater. As a result, the load of the ATX power supply unit has become higher and higher. In case that the ATX power supply unit supplies unstable power or the power with insufficient wattage, the computer is apt to crash to lose the data in the computer. In some more serious cases, the high-level products in the computer may damage. Therefore, many users encounter the problem that the output power of the original ATX power supply unit is insufficient so that the ATX power supply unit cannot provide sufficient wattage for the upgraded personal computer. As a result, the user must repurchase a new ATX power supply unit with larger wattage to satisfy the upgraded personal computer. However, this will lead to increase of the cost of the hardware for upgrading the personal computer. Also, in case the original undamaged ATX power supply unit is discarded, the resource is wasted.

SUMMARY OF THE INVENTION

It is therefore a primary object of the present invention to provide a power coupling device with detection and power adjustment function. The power coupling device is able to detect the flowing direction the current and adjust the output power so as to achieve a balancing effect for the output and supply regulated power.

It is a further object of the present invention to provide the above power coupling device, which is installed in a power supply unit. The power supply unit can be externally connected to another power supply unit. The switch unit of the power coupling device serves to change the impedance and adjust the currents of the output powers of the two power supply units so as to adjust the power of the output power and make the currents of the output powers closer to each other.

To achieve the above and other objects, the power coupling device with detection and power adjustment function of the present invention includes at least one detection unit, at least one switch unit, at least one coupling unit, at least one amplification unit, at least one comparison unit and at least one logic unit. The detection unit has a first detection member and a second detection member. Each of the first and second detection members has a first end and a second end. The first ends of the first and second detection members respectively serve to receive a first operation power and a second operation power. The first and second detection members serve to detect the current flowing through the first and second detection members. The switch unit is respectively connected to the second ends of the first and second detection members and a power output end. The coupling unit is respectively connected to the second ends of the first and second detection members and the power output end. The coupling unit serves to couple the received first and second operation powers to generate a regulated output power, the power output end serving to output the regulated output power. The amplification unit has a first amplifier and a second amplifier. The first and second amplifiers are respectively bridged between the first and second ends of the first and second detection members. The first and second amplifiers respectively serve to judge the flowing direction of the currents on the first and second detection members and amplify the current so as to generate a first amplification signal and a second amplification signal. The comparison unit is connected to the first and second amplifiers and the first ends of the first and second detection members. The comparison unit serves to compare and receive the voltage of the first and second amplification signals to generate a first comparison result and compare and receive the voltage of the first and second operation powers to generate a second comparison result. The logic unit is connected to the at least one comparison unit and the at least one switch unit. According to the first and second comparison results, the logic unit logically judges to generate a triggering signal for controlling and turning on or turning off the at least one switch unit so as to adjust the power of the regulated output power and achieve a balancing effect for the output and supply regulated power.

In the above power coupling device, the at least one switch unit includes a first switch member and a second switch member. Each of the first and second switch members has a first end, a second end and a third end. The first ends of the first and second switch members are respectively connected to the second ends of the first and second detection members. The second end of the first switch member is connected to the second end of the second switch member and the power output end. The third ends of the first and second switch members are connected to the at least one logic unit.

In the above power coupling device, each of the first and second amplifiers has a first input end, a second input end and an output end. The first and second input ends of the first amplifier are respectively bridged between the first and second ends of the first detection member. The first and second input ends of the second amplifier are respectively bridged between the first and second ends of the second detection member. The output ends of the first and second amplifiers are respectively connected to the at least one comparison unit.

In the above power coupling device, the at least one comparison unit includes a first comparator and a second comparator. Each of the first and second comparators has a first input end, a second input end and an output end. The first and second input ends of the first comparator are respectively correspondingly connected to the output ends of the first and second amplifiers. The first comparator serves to compare and receive the voltage of the first and second amplification signals to generate the first comparison result. The output end of the first comparator serves to output the first comparison result to the at least one logic unit. The first and second input ends of the second comparator are respectively connected to the first input ends of the first and second amplifiers. The second comparator serves to compare and receive the voltage of the first and second operation powers to generate the second comparison result. The output end of the second comparator serves to output the second comparison result to the at least one logic unit.

In the above power coupling device, the at least one logic unit includes a first logic processor and a second logic processor. The first and second logic processors are connected to the output ends of the first and second comparators. According to the first and second comparison results, the first logic processor logically judges to generate a first triggering signal for controlling the second switch member to turn on or turn off the second switch member. According to the first and second comparison results, the second logic processor logically judges to generate a second triggering signal for controlling the first switch member to turn off or turn on the first switch member, whereby the first and second switch members will not be turned on at the same time.

In the above power coupling device, the at least one logic unit further includes a third logic processor. The third logic processor is connected to the output ends of the first and second amplifiers. According to the high or low level of the first and second amplification signals, the third logic processor logically judges to generate a third triggering signal for controlling the first and second switch members to turn on or turn off the first and second switch members at the same time.

In the above power coupling device, the first logic processor includes a first AND gate. Two input ends of the first AND gate are respectively connected to the output ends of the first and second comparators. An output end of the first AND gate is connected to the third end of the second switch member. The second logic processor including a first NOT gate and a second NOT gate. First ends of the first and second NOT gates are respectively connected to the two input ends of the second AND gate. Second ends of the first and second NOT gates are respectively connected to the output end of the second comparator and the output end of the first comparator. The output end of the second AND gate is connected to the third end of the first switch member.

In the above power coupling device, the third logic processor includes an XOR gate. Two input ends of the XOR gate are respectively connected to the output ends of the first and second amplifiers. An output end of the XOR gate is connected to the third ends of the first and second switch members.

In the above power coupling device, when the two input ends of the first AND gate receive the first and second comparison results in high level, the output end of the first AND gate outputs the first triggering signal in high level to control and turn on the second switch member. When the two input ends of the first AND gate receive the first comparison result in low level and the second comparison result in high level or low level, the output end of the first AND gate outputs the first triggering signal in low level to control and turn off the second switch member.

In the above power coupling device, when the two input ends of the second AND gate receive that the first and second NOT gates convert the low level of the first and second comparison results into high level, the output end of the second AND gate outputs a second triggering signal in high level to control and turn on the first switch member. When the two input ends of the second AND gate receive that the first and second NOT gates convert the high level of the second comparison result into low level and convert the low level of the first comparison result into high level, the output end of the second AND gate outputs the second triggering signal in low level to control and turn off the first switch member.

In the above power coupling device, when the two input ends of the XOR gate receive that the first and second amplification signals have different levels, the output end of the XOR gate outputs the third triggering signal in high level to control and turn on both the first and second switch members. When the two input ends of the XOR gate receive that the first and second amplification signals have the same level, the output end of the XOR gate outputs the third triggering signal in low level to control and turn off both the first and second switch members.

In the above power coupling device, the at least one coupling unit includes at least one first inductor, at least one second inductor and at least one capacitor. First ends of the first and second inductors are respectively correspondingly connected to the second ends of the first and second detection members. Second end of the first inductor is connected to second end of the second inductor and first end of the capacitor and the power output end. Second end of the capacitor is connected to a grounding end.

In the above power coupling device, the power coupling device is applied to and installed in a power supply unit. The power supply unit includes multiple power ends for providing multiple first operation powers. One of the power ends of the power supply unit is correspondingly connected to the first end of the first detection member to provide the first operation power. Another power supply unit includes multiple power ends for providing multiple second operation powers. One of the power ends of the other power supply unit is correspondingly connected to the first end of the second detection member for providing the second operation power. The power output end is connected to a motherboard for providing the regulated output power to the motherboard.

In the above power coupling device, the first and second amplifiers are error amplifiers, the first and second comparators are comparison amplifiers and the first and second detection members are resistors.

In the above power coupling device, the power supply unit and the other power supply unit are ATX power supply units.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
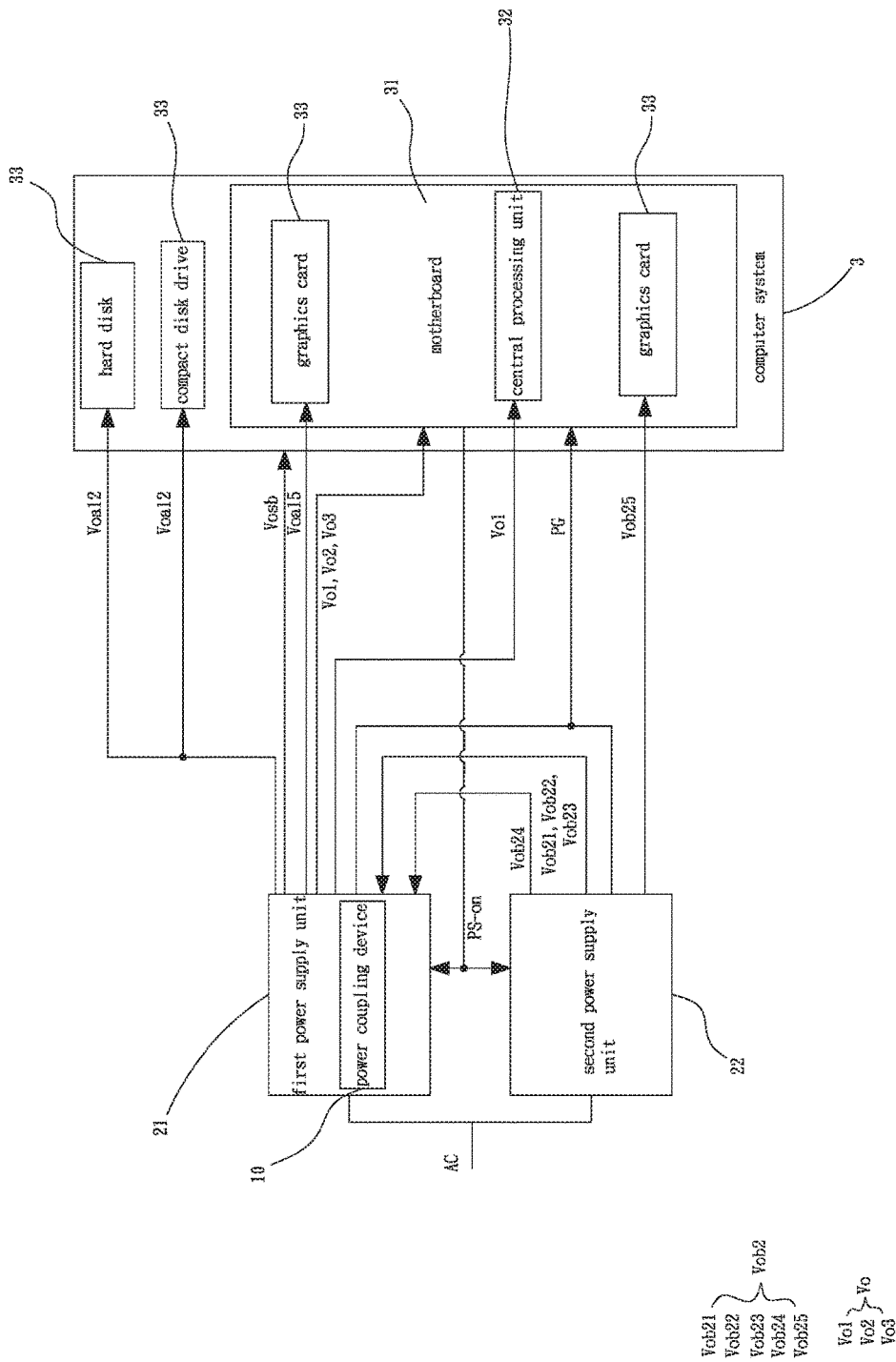
FIG. 1 is a block diagram of the present invention.
Figure 2:
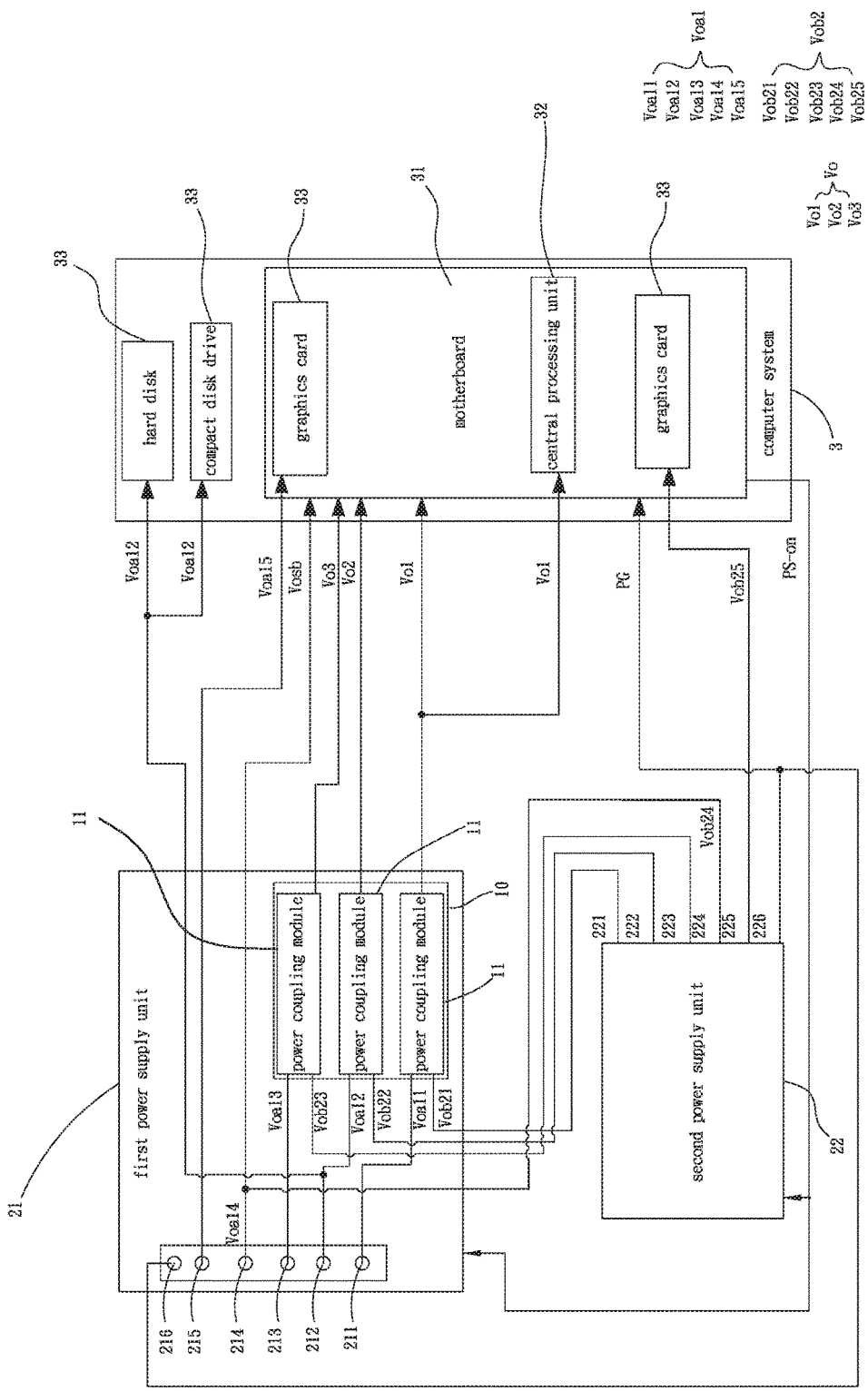
FIG. 2 is another block diagram of the present invention.

Please refer to FIGS. 1 and 2. FIG. 1 is a block diagram of the present invention. FIG. 2 is another block diagram of the present invention. Also supplementally referring to FIG. 3, the power coupling device 10 with detection and power adjustment function of the present invention is applied to a power supply unit. In this embodiment, the power coupling device 10 is arranged in the power supply unit (referred to as the first power supply unit 21 hereinafter). The power coupling device 10 in the power supply unit is connected to another power supply unit (referred to as the second power supply unit 22 hereinafter). The first and second power supply units 21, 22 are powered by an AC power supply. The first and second power supply units 21, 22 are respectively connected to a motherboard 31 in a computer system 3 (such as a personal computer). The power coupling device 10 serves to couple a first operation power Voa1 provided by the power supply unit (the first power supply unit 21) with a second operation power Vob2 provided by an externally connected power supply unit (the second power supply unit 22) to generate a regulated output power Vo for the motherboard 31. The first and second power supply units 21, 22 are advanced technology extended (ATX) power supply units. Each of the first and second power supply units 21, 22 includes multiple power ends and a power good end 216, 226. The power good ends 216, 226 of the first and second power supply units 21, 22 serve to output a power good signal PG to inform (or return to) the motherboard 31. Accordingly, the motherboard 31 can know that the first and second power supply units 21, 22 have generated the regulated first and the operation powers Voa1, Vob2.

In this embodiment, each of the first and second power supply units 21, 22 has, but not limited to, five power ends for illustration purposes, that is, a first power end 211, 221, a second power end 212, 222, a third power end 213, 223, a fourth power end 214, 224 and a fifth power end 215, 225. The power ends (the first, second, third, fourth and fifth power ends 211, 212, 213, 214, 215) of the first power supply unit 21 serve to provide multiple first operation powers Voa1. The power ends (the first, second, third, fourth and fifth power ends 221, 222, 223, 224, 225) of the second power supply unit 22 serve to provide multiple second operation powers Vob2.

In this embodiment, the first and second power supply units 21, 22 respectively provide five first operation powers Voa1 and five second operation powers Vob2. That is, the first operation powers Voa1 include a first first operation powers Voa11, a first second operation powers Voa12, a first third operation powers Voa13, a first fourth operation powers Voa14 and a first fifth operation powers Voa15. The second operation powers Vob2 include a second first operation powers Vob21, a second second operation powers Vob22, a second third operation powers Vob23, a second fourth operation powers Vob24 and a second fifth operation powers Vob25. The first, second, third, fourth and fifth operation powers Voa11, Voa12, Voa13, Voa14, Voa15 are sequentially 12V, 5V, 3.3V, 5 VSB and 12V corresponding to the first, second, third, fourth and fifth power ends 211, 212, 213, 214, 215. The first, second, third, fourth and fifth operation powers Vob21, Vob22, Vob23, Vob24, Vob25 are sequentially 12V, 5V, 3.3V, 5 VSB and 12V corresponding to the first, second, third, fourth and fifth power ends 221, 222, 223, 224, 225. In practice, the number of the first and second operation powers Voa1, Vob2 is not limited to five. The number of the first and second operation powers Voa1, Vob2 can be previously adjusted into four (such as 12V, 5V, 3.3V, 5 VSB) or more than five (such as two sets of 12V, 5V, 3.3V, 5 VSB and 12V) according to the required design of the computer system 3.

When the power supply unit and the other power supply unit are in an activation state, (that is, the first and second power supply units 21, 22 are turned on), the first and second power supply units 21, 22 respectively supply DC 12V, 5V, 3.3V and 12V (the first first, first second, first third and first fifth operation powers Voa11, Voa12, Voa13, Voa15 and the second first, second second, second third and second fifth operation powers Vob21, Vob22, Vob23, Vob25). However, when the power supply unit and the other power supply unit are in a standby state, (that is, the first and second power supply units 21, 22 are turned off), the first and second power supply units 21, 22 will not supply the first and second operation powers Voa1 and Vob2. Only the 5 VSB (the first fourth operation power Voa14 and the second fourth operation powers Vob24) lastingly exists for the computer system 3 (such as the personal computer) to use in the standby state. Therefore, no matter whether the power supply unit and the other power supply unit (the first and second power supply units 21, 22) are in the activation state or in the standby state, the first and second power supply units 21, 22 will always supply the first fourth operation power Voa14 such as 5 VSB and the second fourth operation power Vob24 such as 5 VSB. In addition, the motherboard 31 provides a control signal (such as PS_ON signal) to control the turning on/off of the first and second power supply units 21, 22, (that is, the activation state or the standby state of the first and second power supply units 21, 22).

The power coupling device 10 includes at least one detection unit 111, at least one switch unit 112, at least one coupling unit 115, at least one amplification unit 116, at least one comparison unit 118 and at least one logic unit 119. The detection unit 111, switch unit 112, coupling unit 115, amplification unit 116, comparison unit 118 and logic unit 119 form a power coupling module 11. In this embodiment, for illustration purposes, there are three power coupling modules 11 for respectively coupling and balancing the three first and second operation powers Voa1, Vob2 (such as 12V, 5V, 3.3V) of the first and second power supply units so as to output three regulated output powers Vo1, Vo2, Vo3. That is, the first first, first second and first third operation powers Voa11, Voa12, Voa13 are provided for the first end 1111a of a first detection member 111a of the detection unit 111 of each of the three corresponding power coupling modules 11. Also, the second first, second second and second third operation powers Vob21, Vob22, Vob23 are provided for the first end 1111b of a second detection member 111b of the detection unit 111 of each of the three corresponding power coupling modules 11. Accordingly, the three power coupling modules 11 are respectively coupled and balanced to output, but not limited to, a first regulated output power Vo1 (such as 12V), a second regulated output power Vo2 (such as 5V) and a third regulated output power Vo3 (such as 3.3V). In practice, the number of the power coupling modules 11 in the power coupling device 10 of the first power supply unit 21 can be previously adjusted according to the required design of the computer system 3 or output power for more first and second operation powers Voa1, Vob2 to use. For example, the number of the first and second operation powers Voa1, Vob2 of each of the first and second power supply units 21, 22 is five (such as two sets of 12V, 5V, 3.3V and 5 VSB), in which four sets are respectively two sets of 12V, 5V and 3.3V that need to be coupled and balanced and output. Accordingly, the four sets of first and second operation powers Voa1, Vob2 are provided for the four corresponding power coupling modules 11.

Figure 5:
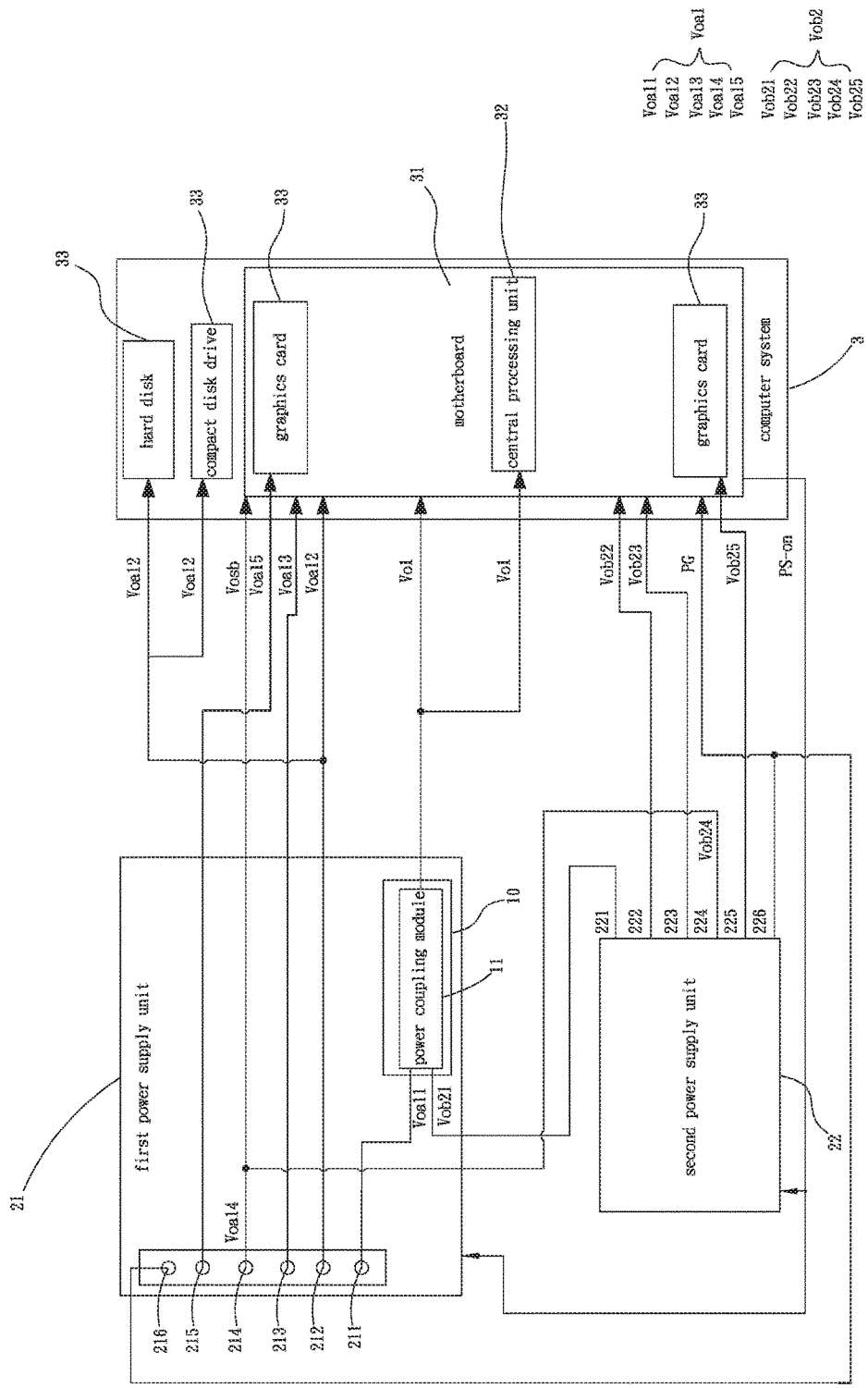
FIG. 5 is a block diagram of a modified embodiment of the present invention.

In a modified embodiment as shown in FIG. 5, the power coupling device 10 can be designed with only one power coupling module 11 for one set of first and second operation powers Voa1, Vob2 (such as the first first operation powers Voa11 and the second first operation power Vob21) of the first and second power supply units 21, 22 to use so as to couple and balance and output one set of regulated output power Vo (such as first regulated output power Vo1).

In this embodiment, the first, second and third regulated output powers Vo1, Vo2, Vo3 of the three power coupling modules 11 are sequentially 12V, 5V and 3.3V provided for the motherboard 31 and the electronic components thereon, (such as the central processing unit). With respect to the peripheral components of the computer system 3, (such as the hard disk 33, the fan, the compact disk drive 33 and the graphics card), the first and second operation powers Voa1, Vob2 of the first and second power supply units 21, 22, (such as the first second, first third and first fifth operation powers Voa12, Voa13, Voa15 and the second fifth operation power Vob25) that are free from the power coupling device 10 are, but not limited to, directly provided for the peripheral components of the computer system 3. In this embodiment, the fourth power ends 214, 224 of the first and second power supply units 21, 22 are connected to the first fourth operation power Voa14 (such as 5 VSB) and the second fourth operation power Vob24 (such as 5 VSB) in parallel. After connected in parallel, the output power Vosb is provided for the motherboard 31. In another modified embodiment, the fourth power ends 214, 224 of the first and second power supply units 21, 22 can employ a coupler (not shown) simply composed of inductors and capacitors to couple the first fourth operation power Voa14 (such as 5 VSB) and the second fourth operation power Vob24 (such as 5 VSB) and output power for the motherboard 31. In addition, the other power ends (such as the second, third and fifth power ends 212, 213, 215, 222, 223, 225 of the first and second power supply units 21, 22) that are free from the power coupling device 10 can be also connected in parallel or coupled to output power as the fourth power ends 214, 224.

Figure 3:
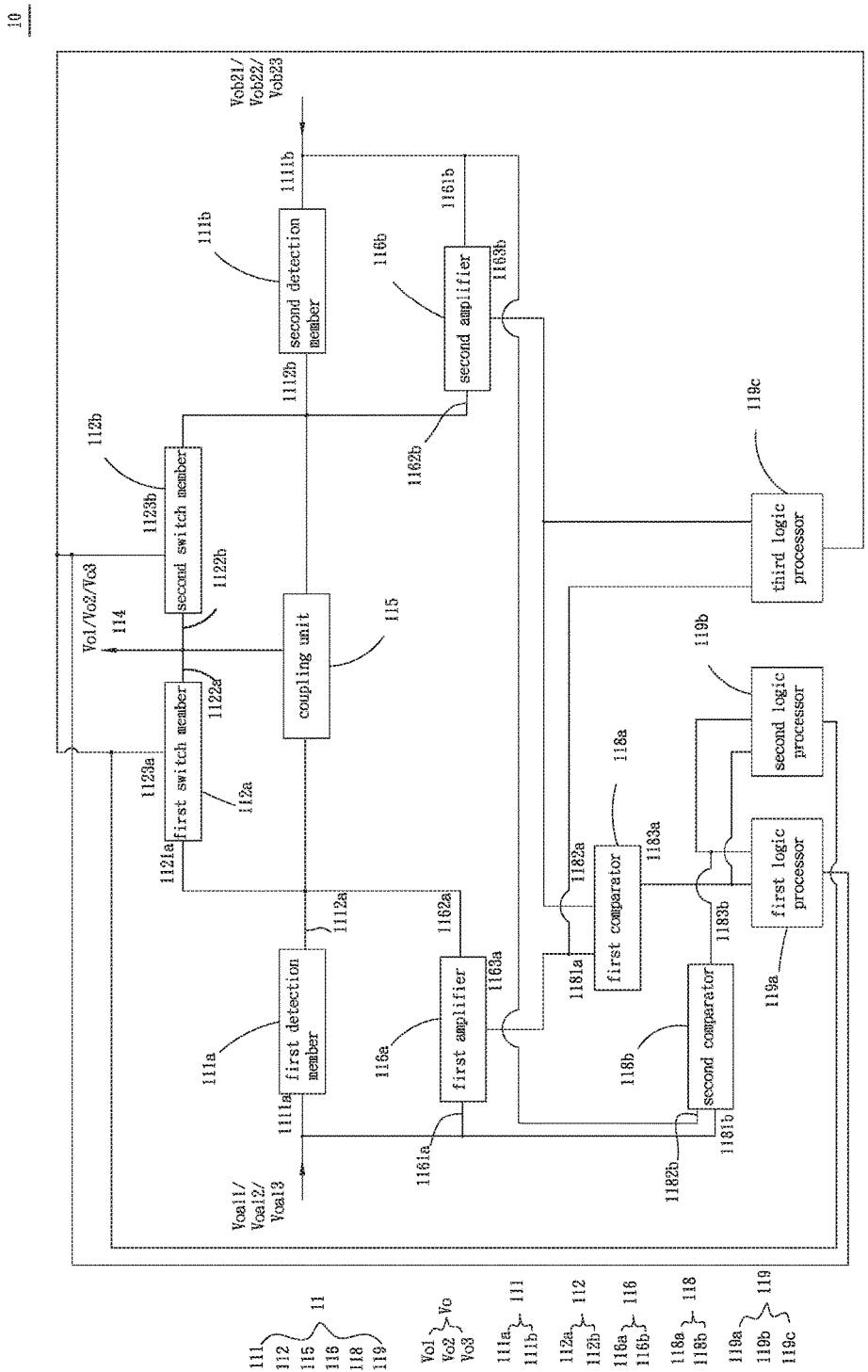
FIG. 3 is a block diagram of the power coupling module of the present invention.

Please now refer to FIGS. 2 and 3. In order to facilitate the description, only the structure, connection relationship and effect of the respective units in the first power coupling module 11 are described hereinafter. The structure, connection relationship and effect of the respective units in the rest second and third power coupling modules 11 are identical to the first power coupling module 11 and thus will not be repeatedly described. The detection unit 111 of the aforesaid power coupling module 11 (the first power coupling module 11) has the first detection member 111a and the second detection member 111b. Each of the first and second detection members 111a, 111b has a first end 1111a, 1111b and a second end 1112a, 1112b. The first end 1111a of the first detection member 111a is connected to one (such as the first power end 211) of the power ends of the power supply unit (the first power supply unit 21) for receiving the first operation power Voa1 (such as the first first operation power Voa11 of 12V) provided by the power supply unit. The first end 1111b of the second detection member 111b is connected to one (such as the first power end 221) of the power ends of the other power supply unit (the second power supply unit 22) for receiving the second operation power Vob2 (such as the second first operation power Vob21 of 12V) provided by the other power supply unit. In addition, the first and second detection members 111a, 111b serve to detect the current flowing through the first and second detection members 111a, 111b.

In addition, the structure, connection relationship and effect of the first and second detection members 111a, 111b of the rest second and third power coupling modules 11 are substantially identical to the first and second detection members 111a, 111b of the first power coupling module 11. The difference is that the first end 1111a of the first detection member 111a of the second power coupling module 11 is connected to the second power end 212 of the first power supply unit 21 for receiving the provided first second operation power Voa12 (such as 5V). The first end 1111b of the second detection member 111b of the second power coupling module 11 is connected to the second power end 222 of the second power supply unit 22 for receiving the second second operation power Vob22 (such as 5V). The first end 1111a of the first detection member 111a of the third power coupling module 11 is connected to the third power end 213 of the first power supply unit 21 for receiving the provided first third operation power Voa13 (such as 3.3V). The first end 1111b of the second detection member 111b of the third power coupling module 11 is connected to the third power end 223 of the second power supply unit 22 for receiving the second third operation power Vob23 (such as 3.3V).

The switch unit 112 includes a first switch member 112a and a second switch member 112b. Each of the first and second switch members 112a, 112b (such as MOS transistors) has a first end 1121a, 1121b and a second end 1122a, 1122b and a third end 1123a, 1123b. The first ends 1121a, 1121b of the first and second switch members 112a, 112b are respectively connected to the second ends 1112a, 1112b of the first and second detection members 111a, 111b. The second end 1122a of the first switch member 112a is connected to the second ends 1122b of the second switch member 112b and a power output end 114. The power output end 114 is correspondingly connected to the motherboard 31. The third ends 1123a, 1123b of the first and second switch members 112a, 112b are connected to the logic unit 119. The coupling unit 115 is respectively connected to the second ends 1112a, 1112b of the first and second detection members 111a, 111b and the power output end 114. The coupling unit 115 serves to couple the received first and second operation power Voa1, Vob2 (such as the first first operation power Voa11 and the second first operation power Vob21) so as to generate the first regulated output power Vo1 (such as 12V). The power output end 114 serves to output the first regulated output power Vo1 for the motherboard 31 and the central processing unit (CPU). In addition, the structure, connection relationship and effect of the first and second switch members 112a, 112b and coupling units 115 of the rest second and third power coupling modules 11 are substantially identical to the first and second switch members 112a, 112b and coupling units 115 of the first power coupling module 11. The difference is that the power output ends 114 of the second and third power coupling modules 11 are respectively correspondingly connected to the motherboard 31. The coupling unit 115 of the second power coupling module 11 serves to couple the received first second operation power Voa12 and the second second operation power Vob22 to generate the second regulated output power Vo2 (such as 5V) for the motherboard 31. The coupling unit 115 of the third power coupling module 11 serves to couple the received first third operation power Voa13 and the second third operation power Vob23 to generate the third regulated output power Vo3 (such as 3.3V) for the motherboard 31.

Please further refer to FIGS. 2 and 3. The amplification unit 116 has a first amplifier 116a and a second amplifier 116b. The first and second amplifiers 116a, 116b serve to judge the flowing direction of the current and amplify the current. Each of the first and second amplifiers 116a, 116b has a first input end 1161a, 1161b, a second input end 1162a, 1162b and an output end 1163a, 1163b. The first and second input ends 1161a, 1161b of the first amplifier 116a are respectively bridged between the corresponding first and second ends 1111a, 1112a of the first detection member 111a for judging the flowing direction of the current Ia on the first detection member 111a and amplify the current so as to generate a first amplification signal. For example, in case the first amplifier 116a judges that the current Ia on the first detection member 111a flows from the first input end 1161a of the first amplifier 116a to the second input end 1162a, then the first amplifier 116a judges that the direction of the current Ia of the first first operation power Voa11 flowing through the first detection member 111a is positive. In case the first amplifier 116a judges that the current Ia flows from the second input end 1162a of the first amplifier 116a to the first input end 1161a, then the first amplifier 116a judges that the direction of the current Ia is negative. The first and second input ends 1161b, 1162b of the second amplifier 116b are respectively bridged between the corresponding first and second ends 1111b, 1112b of the second detection member 111b for judging the flowing direction of the current Ib on the second detection member 111b and amplify the current so as to generate a second amplification signal. For example, in case the second amplifier 116b judges that the current Ib on the second detection member 111b flows from the first input end 1161b of the second amplifier 116b to the second input end 1162b, then the second amplifier 116b judges that the direction of the current Ib of the second first operation power Vob21 flowing through the second detection member 111b is positive. In case the second amplifier 116b judges that the current Ib flows from the second input end 1162b of the second amplifier 116b to the first input end 1161b, then the second amplifier 116b judges that the direction of the current Ib is negative. In addition, the output ends 1163a, 1163b of the first and second amplifiers 116a, 116b are respectively connected to the comparison unit 118. In case the directions of the current Ia, Ib are judged positive, this means the voltage output is positive potential and the power supply units (the first and second power supply units 21, 22) normally supply power. In case the directions of the current Ia, Ib are judged negative, this means the voltage output is negative potential and the power supply units (the first and second power supply units 21, 22) stop working (fail to supply power) or are damaged. The structure, connection relationship and effect of the first and second amplifiers 116a, 116b of the rest second and third power coupling modules 11 are substantially identical to the first and second amplifiers 116a, 116b of the first power coupling module 11.

The comparison unit 118 is connected to the first and second amplifiers 116a, 116b and the first ends 1111a, 1111b of the first and second detection members 111a, 111b. The comparison unit 118 includes a first comparator 118a and a second comparator 118b. The first comparator 118a serves to judge the flowing direction of the current and the highness of the voltage and amplify the voltage. The second comparator 118b serves to judge the highness of the voltage and amplify the voltage. Each of the first and second comparators 118a, 118b has a first input end 1181a, 1181b, a second input end 1182a, 1182b and an output end 1183a, 1183b. The first and second input ends 1181a, 1182a of the first comparator 118a are respectively correspondingly connected to the output ends 1163a, 1163b of the first and second amplifiers 116a, 116b. The output end 1183a of the first comparator 118a is connected to the logic unit 119. The first comparator 118a compares and receives the voltage of the first and second amplification signals to generate the first comparison result. The output end 1183a of the first comparator 118a outputs the first comparison result to the logic unit 119. For example, the first comparator 118a compares and finds that the voltage of the first amplification signal is larger than the voltage of the second amplification signal to output the first comparison result in a high level or the first comparator 118a compares and finds that the voltage of the second amplification signal is larger than the voltage of the first amplification signal to output the first comparison result in a low level.

The first and second input ends 1181b, 1182b of the second comparator 118b are respectively connected to the first input ends 1161a, 1161b of the first and second amplifiers 116a, 116b. The output end 1183b of the second comparator 118b is connected to the logic unit 119. The second comparator 118b compares and receives the voltage of the first and second operation power Voa1, Vob2 to generate the second comparison result. The output end 1183b of the second comparator 118b transmits the second comparison result to the logic unit 119. For example, the second comparator 118b compares and finds that the voltage of the first first operation power Voa11 is larger than the voltage of the second first operation power Vob21 to output the second comparison result in a high level or the second comparator 118b compares and finds that the voltage of the second first operation power Vob21 is larger than the voltage of the first first operation power Voa11 to output the second comparison result in a low level.

In addition, the structure, connection relationship and effect of the comparison units 118 of the rest second and third power coupling modules 11 are substantially identical to the comparison unit 118 of the first power coupling module 11. The difference is that the second comparator 118b of the second power coupling module 11 compares and finds that the voltage of the first second operation power Voa12 is larger than the voltage of the second second operation power Vob22 to output the second comparison result in a high level or the second comparator 118b compares and finds that the voltage of the second second operation power Vob22 is larger than the voltage of the first second operation power Voa12 to output the second comparison result in a low level. The second comparator 118b of the third power coupling module 11 compares and finds that the voltage of the first third operation power Voa13 is larger than the voltage of the second third operation power Vob23 to output the second comparison result in a high level or the second comparator 118b compares and finds that the voltage of the second third operation power Vob23 is larger than the voltage of the first third operation power Voa13 to output the second comparison result in a low level.

According to the first and second comparison results, the logic unit 119 logically judges to generate a triggering signal for controlling the switch unit 112 to turn on or turn off the switch unit 112 so as to adjust the power of the regulated output power Vo (such as the first regulated power Vo1). The logic unit 119 includes a first logic processor 119a, a second logic processor 119b and a third logic processor 119c. The first logic processor 119a is connected to the output ends 1183a, 1183b of the first and second comparators 118a, 118b. According to the first and second comparison results, the first logic processor 119a logically judges to generate a first triggering signal for controlling the second switch member 112b to turn on or turn off the second switch member 112b. The second logic processor 119b is connected to the output ends 1183a, 1183b of the first and second comparators 118a, 118b. According to the first and second comparison results, the second logic processor 119b logically judges to generate a second triggering signal for controlling the first switch member 112a to turn off or turn on the first switch member 112a. The first and second switch members 112a, 112b will not be turned on at the same time. Therefore, when the first logic processor 119a controls the second switch member 112b to turn on the second switch member 112b, the impedance of the second operation power Vob2 (such as the second first operation power Vob21) passing between the second detection member 111b and the coupling unit 115 is changed and reduced. Accordingly, the two currents flowing through the first and second detection members 111a, 111b are closer to each other so as to achieve a current balancing effect. In this case, the voltage and current of the regulated output power Vo (such as the first regulated output power Vo1) are adjusted to further adjust the power of the regulated output power Vo (such as the first regulated output power Vo1). When the second logic processor 119b controls the first switch member 112a to turn on the first switch member 112a, the impedance of the first operation power Voa1 (such as the first first operation power Voa11) passing between the first detection member 111a and the coupling unit 115 is changed and reduced. Accordingly, the two currents flowing through the first and second detection members 111a, 111b are closer to each other so as to achieve a current balancing effect. In this case, the voltage and current of the regulated output power Vo (such as the first regulated output power Vo1) are adjusted to further adjust the power of the regulated output power Vo (such as the first regulated output power Vo1).

The third logic processor 119c is connected to the output ends 1163a, 1163b of the first and second amplifiers 116a, 116b. According to the high level or low level of the first and second amplification signals, the third logic processor 119c logically judges to generate a third triggering signal for controlling the first and second switch members 112a, 112b to turn on or turn off the first and second switch members 112a, 112b at the same time. For example, in case the first and second amplification signals have different levels, that is, the first amplification signal is in the high level (or low level) and the second amplification signal is in the low level (or high level), the third logic processor 119c logically judges to generate a third triggering signal for controlling the first and second switch members 112a, 112b to turn on the first and second switch members 112a, 112b at the same time so that the impedance of the first and second operation power Voa1, Vob2 (such as the first first operation power Voa11 and the second first operation power Vob21) respectively passing between the corresponding first and second detection members 111a, 111b and the coupling unit 115 is changed and reduced. Accordingly, the two power supply units can work at lowest impedance and the two currents flowing through the first and second detection members 111a, 111b are closer to each other so as to achieve a current balancing effect. In this case, the voltage and current of the regulated output power Vo (such as the first regulated output power Vo1) are adjusted to further adjust the power of the regulated output power Vo (such as the first regulated output power Vo1). When the third logic processor 119c judges that the first amplification signal (or the second amplification signal) is in the low level or no signal is output, this means the five sets of operation power Voa1 (or Vob2) of the first power supply unit 21 (or the second power supply unit 22) have stopped working or one single operation power (such as 12 v) has stopped working. In addition, the structure, connection relationship and effect of the first and second amplifiers 116a, 116b of the first, second and third logic processors 119a, 119b, 119c of the rest second and third power coupling modules 11 are substantially identical to the first, second and third logic processors 119a, 119b, 119c of the first power coupling module 11.

Figure 4:
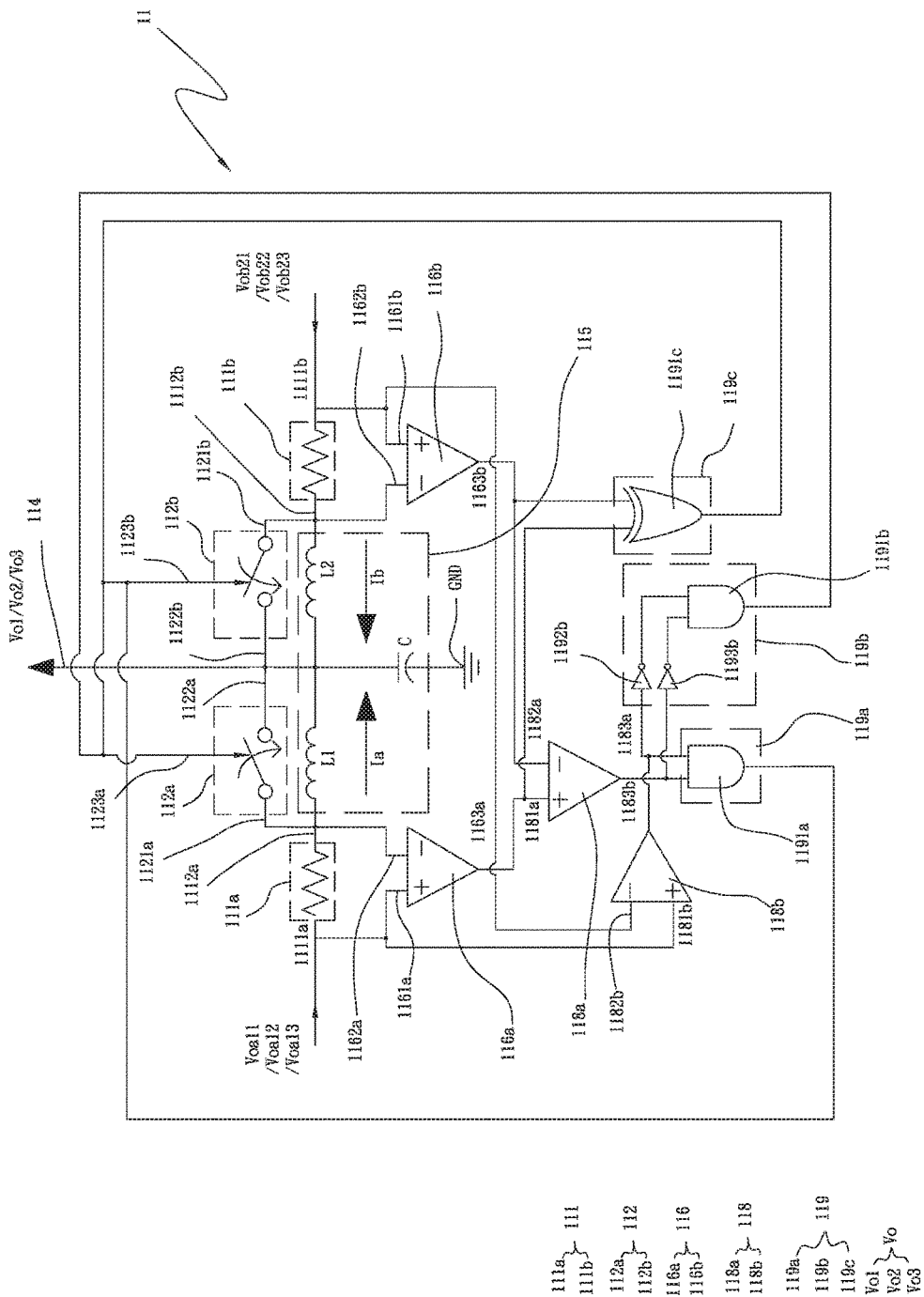
FIG. 4 is a circuit diagram of the power coupling module of the present invention.

Please further refer to FIG. 4 and supplementally refer to FIGS. 2 and 3. The internal components of the first, second and third logic processors 119a, 119b, 119c of the first power coupling module 11 and the first and second amplifiers 116a, 116b of the coupling unit 115 and first and second detection members 111a, 111b are described in detail hereinafter.

In this embodiment, the first and second detection members 111a, 111b are resistors. The first and second amplifiers 116a, 116b are error amplifiers. The first and second comparators 118a, 118b are comparison amplifiers. The coupling unit 115 includes at least one first inductor L1, at least one second inductor L2 and at least one capacitor C. First ends of the first and second inductors L1, L2 are respectively correspondingly connected to the second ends 1112a, 1112b of the first and second detection members 111a, 111b and the first ends 1121a, 1121b of the first and second switch members 112a, 112b. In addition, the first switch member 112a and the first inductor L1 are connected in parallel and the second switch member 112b and the second inductor L2 are also connected in parallel. Second ends of the first inductor L1 is connected to second end of the second inductor L2, first end of the capacitor C, the second ends 1122a, 1122b of the first and second switch members 112a, 112b and the power output end 114. Second end of the capacitor C is connected to a grounding end GND.

The first logic processor 119a includes a first AND gate 1191a. Two input ends of the first AND gate 1191a are respectively connected to the output ends 1183a, 1183b of the first and second comparators 118a, 118b. The output end of the first AND gate 1191a is connected to the third end 1123b of the second switch member 112b. When the first comparator 118a compares and finds that the voltage of the first amplification signal is larger than the voltage of the second amplification signal to output the first comparison result in a high level and the second comparator 118b compares and finds that the voltage of the first operation power Voa1 (such as the first first operation power Voa11) is larger than the voltage of the second operation power Vob2 (such as the second first operation power Vob21) to output the second comparison result in a high level, the two input ends of the first AND gate 1191a will receive the first and second comparison results in high level, whereby the output end of the first AND gate 1191a outputs the first triggering signal in high level to control and turn on the second switch member 112b. At this time, the turned on second switch member 112b of the second inductor L2 is short-circuited to reduce the impedance so as to adjust (such as increase) the magnitude of the current flowing through the second detection member 111b. Accordingly, the two current flowing through the first and second detection members 111a, 111b are closer to each other so as to raise the regulated output power Vo (such as the first regulated output power Vo1 of 12V) and further adjust the power of the regulated output power Vo (such as the first regulated output power Vo1 of 12V). When the two input ends of the first AND gate 1191a receive the first comparison result in low level (or high level) and the second comparison result in high level (or low level), the output end of the first AND gate 1191a outputs the first triggering signal in low level to control and turn off the second switch member 112b.

The second logic processor 119b includes a second AND gate 1191b, a first NOT gate 1192b and a second NOT gate 1193b. First ends of the first and second NOT gates 1192b, 1193b are respectively connected to the two input ends of the second AND gate 1191b. Second ends of the first and second NOT gates 1192b, 1193b are respectively connected to the output end 1183b of the second comparator 118b and the output end 1183a of the first comparator 118a. The first NOT gate 1192b serves to receive the second comparison result. The second NOT gate 1193b serves to receive the first comparison result. The output end of the second AND gate 1191b is connected to the third end 1123a of the first switch member 112a. When the first comparator 118a compares and finds that the voltage of the second amplification signal is larger than the voltage of the first amplification signal to output the first comparison result in a low level and the second comparator 118b compares and finds that the voltage of the second operation power Vob2 (such as the second first operation power Vob21) is larger than the voltage of the first operation power Voa1 (such as the first first operation power Voa11) to output the second comparison result in a low level, the two input ends of the second AND gate 1191b will receive that the first and second NOT gates 1192b, 1193b convert the low level of the first and second comparison results into high level, (that is, the two input ends of the second AND gate 1191b receive the first and second comparison results both in high level), whereby the output end of the second AND gate 1191b outputs the second triggering signal in high level to control and turn on the first switch member 112a.

At this time, the turned on first switch member 112a of the first inductor L1 is short-circuited to reduce the impedance so as to adjust (such as increase) the magnitude of the current flowing through the first detection member 111a. Accordingly, the two current flowing through the first and second detection members 111a, 111b are closer to each other so as to raise the regulated output power Vo (such as the first regulated output power Vo1 of 12V) and further adjust the power of the regulated output power Vo (such as the first regulated output power Vo1 of 12V). When the two input ends of the second AND gate 1191b receive that the first and second NOT gates 1192b, 1193b convert the high level (or low level) of the second comparison result into low level (or high level) and convert the low level (or high level) of the first comparison result into high level (or low level), the output end of the second AND gate 1191b outputs the second triggering signal in low level to control and turn off the first switch member 112a.

The third logic processor 119c includes an XOR gate 1191c. Two input ends of the XOR gate 1191c are respectively connected to the output ends 1163a, 1163b of the first and second amplifiers 116a, 116b. The output end of the XOR gate 1191c is connected to the third ends 1123a, 1123b of the first and second switch members 112a, 112b. When the first power end 221 (or the second power end 222 or the third power end 223) of the second power supply unit 22 is abnormal (such as damages or fails to supply power), while the first power end 211 (or the second power end 212 or the third power end 213) of the first power supply unit 21 normally supplies power, the first amplifier 116a judges that the direction of the current Ia is positive and the voltage is positive potential to output the first amplification signal in high level. The second amplifier 116b judges that the direction of the current Ib is negative and the voltage is negative potential (or zero) to output the second amplification signal in low level. Accordingly, the levels of the first and second amplification signals are different from each other, whereby the output end of the XOR gate 1191c outputs the third triggering signal in high level to control and turn on both the first and second switch members 112a, 112b. At this time, the turned on first and second switch members 112a, 112b of the first and second inductors L1, L2 are respectively short-circuited to reduce the impedance so as to adjust (such as increase) the magnitude of the current flowing through the first and second detection members 111a, 111b. Accordingly, the two current are closer to each other so as to raise the regulated output power Vo (such as the first regulated output power Vo1 or the second regulated output power Vo2 or the third regulated output power Vo3) and further adjust the power of the regulated output power Vo (such as the first regulated output power Vo1 of 12V or the second regulated output power Vo2 of 5V or the third regulated output power Vo3 of 3.3V). When the two input ends of the XOR gate 1191c receive that the first and second amplification signals have the same level (such as both the first and second amplification signals are in the high level), the output end of the XOR gate 1191c outputs the third triggering signal in low level to control and turn off both the first and second switch members 112a, 112b.

In addition, the structure and connection relationship of the internal components of the first, second and third logic processors 119a, 119b, 119c and the coupling unit 115 and the first and second amplifiers 116a, 116b and the first and second detection members 111a, 111b of the second and third power coupling modules 11 are identical to the structure and connection relationship of the internal components of the first, second and third logic processors 119a, 119b, 119c and the coupling unit 115 and the first and second amplifiers 116a, 116b and the first and second detection members 111a, 111b of the first power coupling module 11 and thus will not be repeatedly described hereinafter.

According to the above, by means of the power coupling device 10 in the power supply unit (such as the first power supply unit 21), the power supply unit can be easily externally connected to another power supply unit (such as the second power supply unit 22) with different wattage or the same wattage to form a large-wattage power supply unit. For example, there are a power supply unit with 500 watt and another power supply unit with 700 watt. The power coupling device 10 serves to adjust the currents of the operation powers Voa1, Vob2 of the two power supply units to be nearly equal to each other so as to balance the output. In this case, the two power supply units can be coupled to form a two power supply unit with about 1200 watt to provide sufficient wattage for the motherboard 31 and the central processing unit. Therefore, the power needed by the motherboard 31 and the central processing unit can be provided by the balanced output of the first and second power supply units 21, 22. Accordingly, a balanced supply effect is achieved to satisfy the load needed by the computer system 3.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A power coupling device with detection and power adjustment function, comprising:

at least one detection unit having a first detection member and a second detection member, each of the first and second detection members having a first end and a second end, the first ends of the first and second detection members respectively serving to receive a first operation power and a second operation power, the first and second detection members serving to detect the current flowing through the first and second detection members;

at least one switch unit respectively connected to the second ends of the first and second detection members and a power output end;

at least one coupling unit respectively connected to the second ends of the first and second detection members and the power output end, the coupling unit serving to couple the received first and second operation powers to generate a regulated output power, the power output end serving to output the regulated output power;

at least one amplification unit having a first amplifier and a second amplifier, the first and second amplifiers being respectively bridged between the first and second ends of the first and second detection members, the first and second amplifiers respectively serving to judge the flowing direction of the currents on the first and second detection members and amplify the current so as to generate a first amplification signal and a second amplification signal;

at least one comparison unit connected to the first and second amplifiers and the first ends of the first and second detection members, the comparison unit serving to compare and receive the voltage of the first and second amplification signals to generate a first comparison result and compare and receive the voltage of the first and second operation powers to generate a second comparison result; and at least one logic unit connected to the at least one comparison unit and the at least one switch unit, according to the first and second comparison results, the logic unit logically judging to generate a triggering signal for controlling and turning on or turning off the at least one switch unit so as to adjust the power of the regulated output power.

2. The power coupling device with detection and power adjustment function as claimed in claim 1, wherein the at least one switch unit includes a first switch member and a second switch member, each of the first and second switch members having a first end, a second end and a third end, the first ends of the first and second switch members being respectively connected to the second ends of the first and second detection members, the second end of the first switch member being connected to the second end of the second switch member and the power output end, the third ends of the first and second switch members being connected to the at least one logic unit.

3. The power coupling device with detection and power adjustment function as claimed in claim 2, wherein each of the first and second amplifiers has a first input end, a second input end and an output end, the first and second input ends of the first amplifier being respectively bridged between the first and second ends of the first detection member, the first and second input ends of the second amplifier being respectively bridged between the first and second ends of the second detection member, the output ends of the first and second amplifiers being respectively connected to the at least one comparison unit.

4. The power coupling device with detection and power adjustment function as claimed in claim 3, wherein the at least one comparison unit includes a first comparator and a second comparator, each of the first and second comparators having a first input end, a second input end and an output end, the first and second input ends of the first comparator being respectively correspondingly connected to the output ends of the first and second amplifiers, the first comparator serving to compare and receive the voltage of the first and second amplification signals to generate the first comparison result, the output end of the first comparator serving to output the first comparison result to the at least one logic unit, the first and second input ends of the second comparator being respectively connected to the first input ends of the first and second amplifiers, the second comparator serving to compare and receive the voltage of the first and second operation powers to generate the second comparison result, the output end of the second comparator serving to output the second comparison result to the at least one logic unit.

5. The power coupling device with detection and power adjustment function as claimed in claim 4, wherein the at least one logic unit includes a first logic processor and a second logic processor, the first and second logic processors being connected to the output ends of the first and second comparators, according to the first and second comparison results, the first logic processor logically judging to generate a first triggering signal for controlling the second switch member to turn on or turn off the second switch member, according to the first and second comparison results, the second logic processor logically judging to generate a second triggering signal for controlling the first switch member to turn off or turn on the first switch member, whereby the first and second switch members will not be turned on at the same time.

6. The power coupling device with detection and power adjustment function as claimed in claim 5, wherein the at least one logic unit further includes a third logic processor, the third logic processor being connected to the output ends of the first and second amplifiers, according to the high or low level of the first and second amplification signals, the third logic processor logically judging to generate a third triggering signal for controlling the first and second switch members to turn on or turn off the first and second switch members at the same time.

7. The power coupling device with detection and power adjustment function as claimed in claim 5, wherein the first logic processor includes a first AND gate, two input ends of the first AND gate being respectively connected to the output ends of the first and second comparators, an output end of the first AND gate being connected to the third end of the second switch member, the second logic processor including a first NOT gate and a second NOT gate, first ends of the first and second NOT gates being respectively connected to the two input ends of the second AND gate, second ends of the first and second NOT gates being respectively connected to the output end of the second comparator and the output end of the first comparator, the output end of the second AND gate being connected to the third end of the first switch member.

8. The power coupling device with detection and power adjustment function as claimed in claim 6, wherein the third logic processor includes an XOR gate, two input ends of the XOR gate being respectively connected to the output ends of the first and second amplifiers, an output end of the XOR gate being connected to the third ends of the first and second switch members.

9. The power coupling device with detection and power adjustment function as claimed in claim 7, wherein when the two input ends of the first AND gate receive the first and second comparison results in high level, the output end of the first AND gate outputs the first triggering signal in high level to control and turn on the second switch member, when the two input ends of the first AND gate receive the first comparison result in low level and the second comparison result in high level or low level, the output end of the first AND gate outputting the first triggering signal in low level to control and turn off the second switch member.

10. The power coupling device with detection and power adjustment function as claimed in claim 7, wherein when the two input ends of the second AND gate receive that the first and second NOT gates convert the low level of the first and second comparison results into high level, the output end of the second AND gate outputs a second triggering signal in high level to control and turn on the first switch member, when the two input ends of the second AND gate receive that the first and second NOT gates convert the high level of the second comparison result into low level and convert the low level of the first comparison result into high level, the output end of the second AND gate outputting the second triggering signal in low level to control and turn off the first switch member.

11. The power coupling device with detection and power adjustment function as claimed in claim 8, wherein when the two input ends of the XOR gate receive that the first and second amplification signals have different levels, the output end of the XOR gate outputs the third triggering signal in high level to control and turn on both the first and second switch members, when the two input ends of the XOR gate receive that the first and second amplification signals have the same level, the output end of the XOR gate outputting the third triggering signal in low level to control and turn off both the first and second switch members.

12. The power coupling device with detection and power adjustment function as claimed in claim 1, wherein the at least one coupling unit includes at least one first inductor, at least one second inductor and at least one capacitor, first ends of the first and second inductors being respectively correspondingly connected to the second ends of the first and second detection members, second end of the first inductor being connected to second end of the second inductor and first end of the capacitor and the power output end, second end of the capacitor being connected to a grounding end.

13. The power coupling device with detection and power adjustment function as claimed in claim 8, wherein the power coupling device is applied to and installed in a power supply unit, the power supply unit including multiple power ends for providing multiple first operation powers, one of the power ends of the power supply unit being correspondingly connected to the first end of the first detection member to provide the first operation power, another power supply unit including multiple power ends for providing multiple second operation powers, one of the power ends of the other power supply unit being correspondingly connected to the first end of the second detection member for providing the second operation power, the power output end being connected to a motherboard for providing the regulated output power to the motherboard.

14. The power coupling device with detection and power adjustment function as claimed in claim 4, wherein the first and second amplifiers are error amplifiers, the first and second comparators are comparison amplifiers and the first and second detection members are resistors.

15. The power coupling device with detection and power adjustment function as claimed in claim 13, wherein the power supply unit and the other power supply unit are ATX power supply units.

16. The power coupling device with detection and power adjustment function as claimed in claim 1, wherein the at least one detection unit, the at least one switch unit, the at least one coupling unit, the at least one amplification unit, the at least one comparison unit and the at least one logic unit form at least one power coupling module.

* * * * *